(12) United States Patent
Doerr

(10) Patent No.: US 6,956,987 B2
(45) Date of Patent: Oct. 18, 2005

(54) PLANAR LIGHTWAVE WAVELENGTH BLOCKER DEVICES USING MICROMACHINES

(75) Inventor: Christopher Richard Doerr, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/927,610

(22) Filed: Aug. 26, 2004

(65) Prior Publication Data

US 2005/0025426 A1 Feb. 3, 2005

Related U.S. Application Data

(63) Continuation of application No. 10/425,815, filed on Apr. 29, 2003, now abandoned, which is a continuation of application No. 09/809,126, filed on Mar. 15, 2001, now abandoned.

(51) Int. Cl.$^7$ ............................................. G02B 6/26
(52) U.S. Cl. ............................ 385/17; 385/24; 385/18
(58) Field of Search ............................. 385/17, 24, 15, 385/18, 19, 25, 27, 37, 50

(56) References Cited

U.S. PATENT DOCUMENTS

| | | | |
|---|---|---|---|
| 5,546,483 A | * | 8/1996 | Inoue et al. ................... 385/14 |
| 6,137,927 A | * | 10/2000 | Keck et al. ..................... 385/24 |
| 6,263,127 B1 | * | 7/2001 | Dragone et al. ............... 385/24 |
| 6,428,844 B1 | * | 8/2002 | Gebhard et al. ............ 427/189 |
| 6,453,087 B2 | * | 9/2002 | Frish et al. .................... 385/24 |
| 6,658,179 B2 | * | 12/2003 | Kubby et al. .................. 385/24 |

OTHER PUBLICATIONS

Wilfong et. al., "WDM Cross-Connect Architectures with Reduced Complexity," Journal of Lightwave Technology, vol. 17, No. 10, 1732-1741 (Oct., 1999).

Doerr et al., "2×2 Wavelength-Selective Cross Connect Capable of Switching 128 Channels in Sets of Eight," IEEE Photonics Technology Letters, vol. 14, No. 3, 387-389 (Mar., 2002).

* cited by examiner

Primary Examiner—Kianni C. Kaveh

(57) ABSTRACT

A method and apparatus are disclosed for selectively passing or blocking an optical signal using an opaque or reflective shutter that is selectively positioned in or out of the light path. The disclosed wavelength blocker can be employed to filter input wavelength-division multiplexed (WDM) signal comprised of N wavelength channels, where a mechanical shutter array selectively passes each of the N wavelength channels. Each mechanical shutter may be controlled, for example, by a micromachine control element that physically lifts the shutter into or out of the lightpath. The disclosed wavelength blockers may be utilized in wavelength-selective cross connects, as well as other optical devices. In an exemplary wavelength-selective cross connect, an array of mirrors are employed in a planar waveguide having two sets of waveguide gratings intersecting at an angle. The mirrors and waveguide gratings are positioned such that if the mirror for a given channel is up (removed from the light path), then that channel passes across the device and exits the corresponding output port (bar state), otherwise the light is reflected by the mirror and exits the opposite output port (bar state).

4 Claims, 6 Drawing Sheets

PLANAR LIGHTWAVE WAVELENGTH BLOCKER DEVICES USING MICROMACHINES

CROSS REFERENCE TO RELATED APPLICATION

The present application is a continuation application of U.S. patent application Ser. No. 10/425,815, filed Apr. 29, 2003, now abandoned which is a continuation application of U.S. patent application Ser. No. 09/809,126, filed Mar. 15, 2001, now abandoned.

FIELD OF THE INVENTION

The present invention relates to optical communication networks and, more particularly, to optical devices for routing multi-wavelength optical signals.

BACKGROUND OF THE INVENTION

When multiple users share a transmission medium, some form of multiplexing is required to provide separable user sub-channels. There are many multiplexing techniques available that simultaneously transmit information signals within the available bandwidth, while still maintaining the quality and intelligibility that are required for a given application. Optical communication systems, for example, increasingly employ wavelength division multiplexing (WDM) techniques to transmit multiple information signals on the same fiber, and differentiate each user sub-channel by modulating it with a unique wavelength of invisible light. WDM techniques are being used to meet the increasing demands for increasing speed and bandwidth in optical transmission applications.

In optical communication networks, such as those employing WDM techniques, individual optical signals are often selectively routed to different destinations. Thus, a high capacity matrix or cross-connect switch is often employed to selectively route signals through interconnected nodes in a communication network. Many cross-connect switches used in optical communication networks are either manual or electronic, requiring multiple optical-to-electrical and electrical-to-optical conversions. The speed and bandwidth advantages associated with transmitting information in optical form, however, makes an all-optical network the preferred solution for WDM-based optical networks. Moreover, all-optical network elements are needed to provide the flexibility for managing bandwidth at the optical layer (e.g., on a wavelength by wavelength basis). In addition, it is often desirable to remove light of a given wavelength from a fiber or add light of a given wavelength to the fiber. A device that provides this feature is often referred to as a wavelength add-drop (WAD) multiplexer.

Wavelength blockers are optical devices that accept an incoming signal of multiple wavelength channels and independently pass or block each wavelength channel. Wavelength blockers can be used as components in a larger optical communication system, for example, to route a given optical signal along a desired path between a source and destination. Optical cross-connect switches and wavelength add-drop multiplexers, for example, are often implemented using wavelength blockers. A wavelength blocker provides a number of desirable features. First, a network element using wavelength blockers is modular and thus scalable and repairable. Second, network elements using wavelength blockers have a multicasting capability. Third, wavelength blockers are relatively easy to manufacture with high performance. Wavelength blockers have only two fiber connections, and it is possible to use a polarization diversity scheme to make them polarization independent.

As the demand for optical bandwidth increases in WDM communication systems, it is desirable to increase the number of channels. Unfortunately, an increase in the number of channels provides a corresponding increase in the size, cost and insertion loss of the optical devices in such WDM communication systems. A need therefore exists for improved wavelength blockers that permit optical cross-connect switches, wavelength add-drop multiplexers and other optical devices to be fabricated with reduced size and cost. A further need exists for two-port wavelength blockers that permit optical cross-connect switches and wavelength add-drop multiplexers to be configured without complex waveguide crossings. Yet another need exists for improved wavelength blockers having a frequency spectrum with a generally flat transmission spectrum in both amplitude and phase.

SUMMARY OF THE INVENTION

Generally, a method and apparatus are disclosed for selectively passing or blocking an optical signal using an opaque or reflective shutter that is selectively positioned in or out of the light path. The disclosed wavelength blocker can be employed to filter input wavelength-division multiplexed (WDM) signal comprised of N wavelength channels, where a mechanical shutter array selectively passes each of the N wavelength channels. Each mechanical shutter may be controlled, for example, by a micromachine control element that physically lifts the shutter into or out of the light path.

The disclosed wavelength blockers may be utilized in wavelength-selective cross connects, wavelength add drop multiplexers, as well as other optical devices. In an exemplary wavelength-selective cross connect, an array of mirrors are employed in a planar waveguide having two sets of waveguide gratings intersecting at an angle. The mirrors and waveguide gratings are positioned such that if the mirror for a given channel is up (removed from the light path), then that channel passes across the device and exits the corresponding output port (bar state), otherwise the light is reflected by the mirror and exits the opposite output port (bar state).

A more complete understanding of the present invention, as well as further features and advantages of the present invention, will be obtained by reference to the following detailed description and drawings.

DETAILED DESCRIPTION

Figure 1:
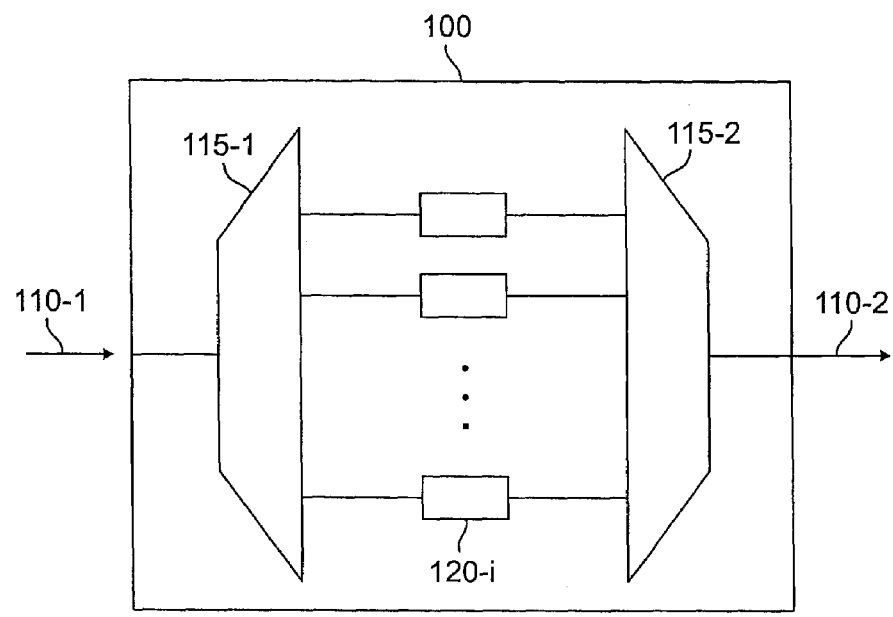
FIG. 1 illustrates a conventional wavelength blocker.

FIG. 1 illustrates a conventional wavelength blocker 100. As shown in FIG. 1, a wavelength blocker 100 is an optical device having two ports 110-1, 110-2 that accept an incoming signal of multiple wavelength channels at a first port 110-1 and independently pass or block each wavelength channel, i, to a second port 110-2. A demultiplexer 115-1 separates the incoming signal into each component wavelength channel, i, which is then selectively passed or blocked by the corresponding shutter 120-i (or variable optical attenuators) to a multiplexer 115-2. The wavelength blocker 100 may be embodied, for example, as the wavelength blocker disclosed in U.S. patent application Ser. No. 09/809,124, entitled "Planar Lightwave Wavelength Blocker," assigned to the assignee of the present invention and incorporated by reference herein, as modified herein in accordance with the present invention.

According to one feature of the present invention, each shutter 120-i is embodied as an opaque element that can be selectively positioned in and out of the light path to selectively pass or block light. In one embodiment, discussed further below, each shutter 120-i may be controlled by a micromachine control element that can physically lift the shutter 120-i in and out of the light path. In accordance with another aspect of the present invention, a plurality of waveguides couple an I/O waveguide to a free space region to generate a phased array of an optical signal within the free space region; and a plurality of mechanical shutters are positioned in the free space region at a focal plane of the phased array to selectively control reflection of portions of a multiple wavelength optical signal to a desired one of a plurality of waveguide arrays to provide switching of the multiple wavelength optical signal.

Figure 2:
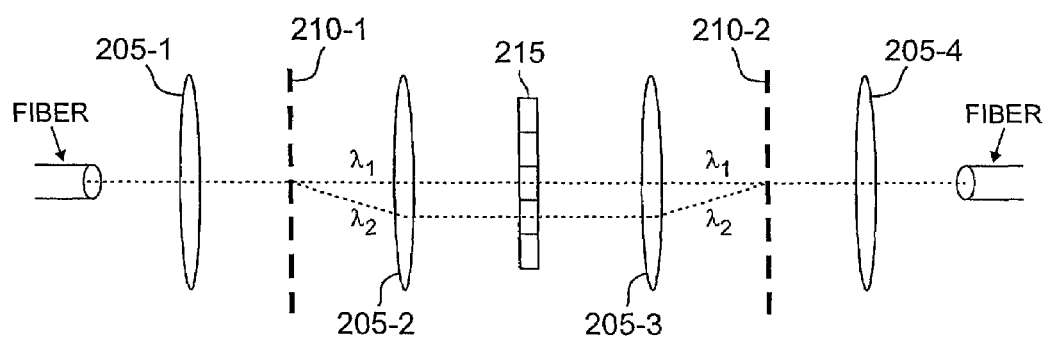
FIG. 2 is an optical diagram illustrating an implementation of the wavelength blocker of FIG. 1.

FIG. 2 is an optical diagram illustrating an implementation of the wavelength blocker 100 of FIG. 1. As shown in FIG. 2, the optical wavelength blocker 200 is comprised of a number of lenses 205-1 through 205-4, two wavelength gratings 210-1 and 210-2 and a control element array 215. The lens 205-1 focuses an input beam on the grating 210-1, which serves to separate each of the wavelength channels. The lens 205-2 focuses each of the wavelength channels on the control element array 215 that selectively passes or blocks each wavelength.

Figure 3:
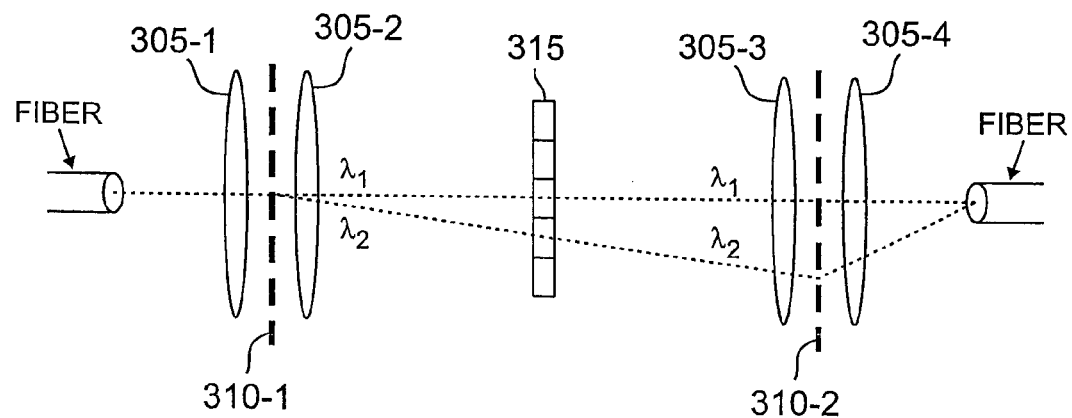
FIG. 3 is an optical diagram illustrating a wavelength blocker incorporating features of the present invention.

FIG. 3 is an optical diagram illustrating a wavelength blocker 300 incorporating features of the present invention. As shown in FIG. 3, the optical wavelength blocker 300 is comprised of two wavelength gratings 310-1 and 310-2 each surrounded by a pair of lenses 305-1, 305-2 and 305-3, 305-4, and a micromachine control element 315. The lenses 305 and gratings 310 operate in the same manner as described above in conjunction with FIG. 2. As previously indicated, the micromachine control element 315 is embodied as a micromachine device that can physically lift opaque pieces in or out of the lightpath to selectively pass or block light.

Figure 4:
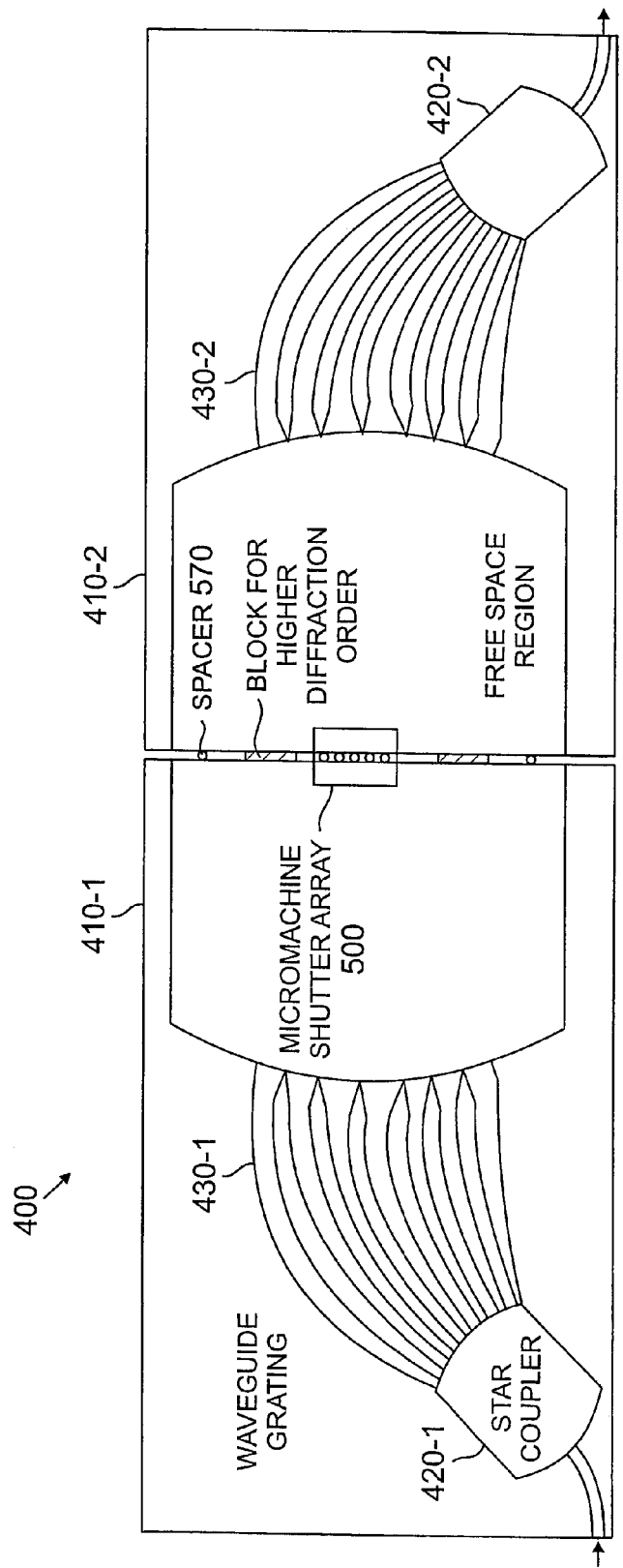
FIG. 4 illustrates a representative waveguide layout for a wavelength blocker using micromachine shutters in accordance with the present invention.

FIG. 4 illustrates a representative waveguide layout for a wavelength blocker 400 using a planar arrangement of waveguides and micromachine shutters, in accordance with the present invention. As shown in FIG. 4, the wavelength blocker 400 consists of two separate planar lightwave circuits 410-1 and 410-2. The planar lightwave circuits 410-1 and 410-2 can optionally have their facets polished and anti-reflection coatings optionally applied where the array of micromachine shutters 500 is positioned. A pair of star couplers 420-1 and 420-2 serve as a demultiplex/multiplex pair coupled by a waveguide grating 430-1, 430-2. The micromachine shutter gallery 500 is discussed below in conjunction with FIG. 5.

It has been observed that non-central wavelengths, such as $\lambda_2$, enter the output fiber in FIG. 3 at a large angle, causing high loss for these channels. However, one can make this loss arbitrarily small by making the aperture of the gratings (310-1, 310-2 in FIG. 3 or 430-1, 430-2 in FIG. 4) very large or the control elements 315, 500 very small (or both). In other words, if the gratings have a large aperture, relative to the shutters, then the non-central wavelengths, such as $\lambda_2$, can be made to enter the output fiber in FIG. 3 at a smaller angle, without using additional lenses. Let the center-to-center spacing between the grating arm inlets on the control-element side be a, and the small control element spacing b, where $b=\lambda R/(Ma)$, where $\lambda$ is the wavelength, R is the distance between the grating and control elements, and M is the number of grating arms. For a flat stopband, one requires at least two minimum control element spacings per channel. Then for the outermost channels (at the edges of the central Brillouin zone), the mode center in the fiber will offset by b/a of its width. If we choose the reasonable values a=25 $\mu$m and b=5 $\mu$m (with 3 element spacing used per channel, so that the channel controls are spaced by 15 $\mu$m center-to-center), then the worst channel is off by only ⅕ of its width. If we then populate only half the central Brillouin zone, this reduces to ⅒, resulting in low loss for all the channels.

Figure 6:
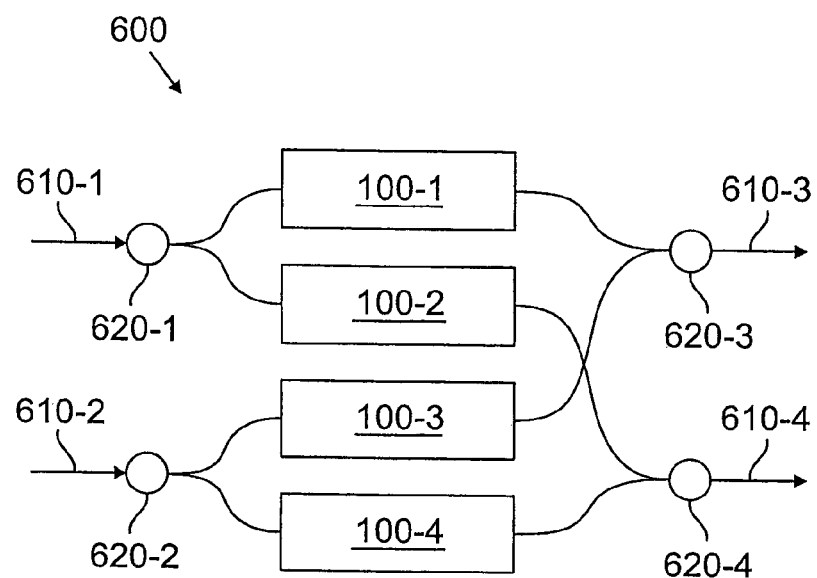
FIG. 6 is a schematic block diagram of a wavelength-selective cross connect (WSC)
Figure 5:
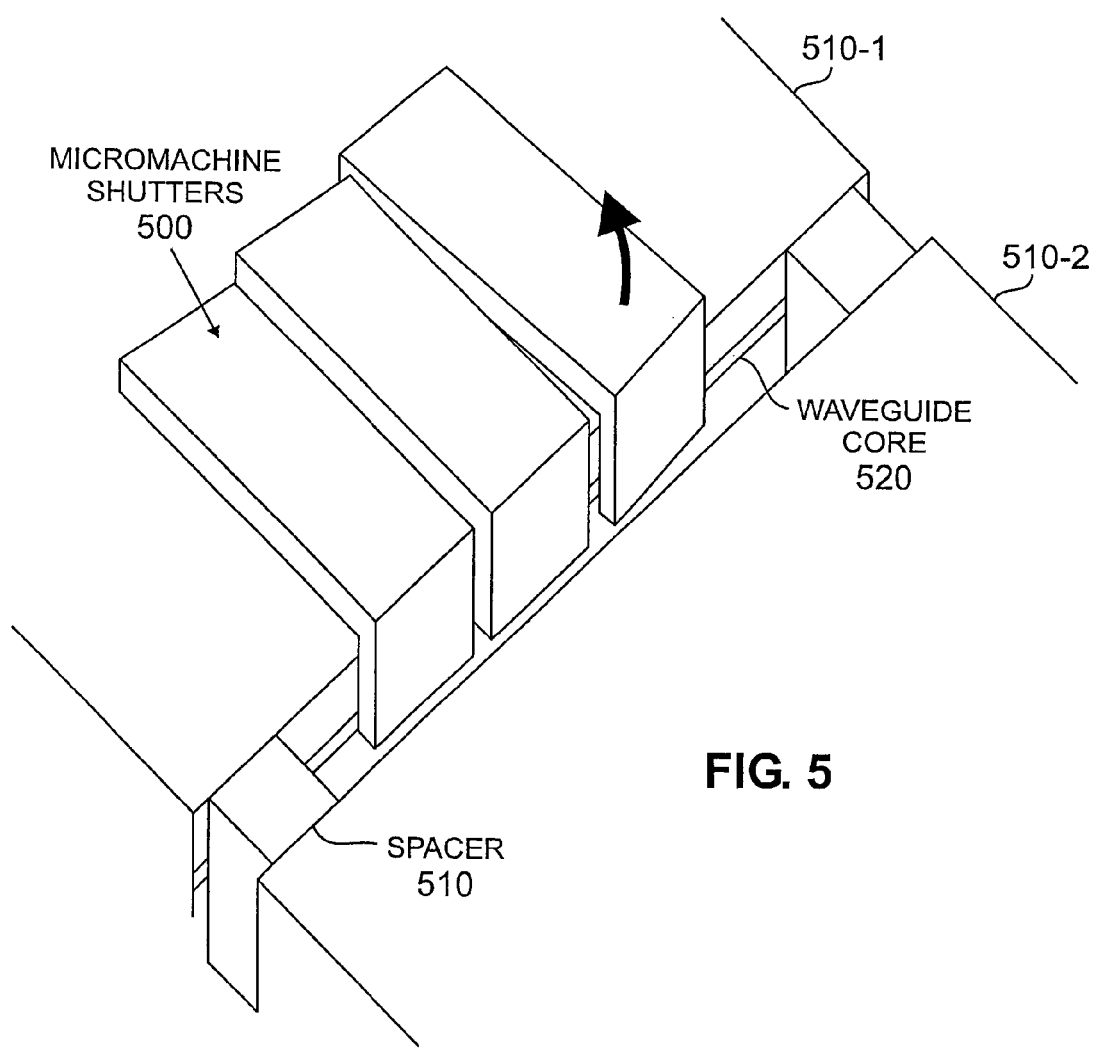
FIG. 5 illustrates the micromachine shutter array of FIG. 4 in further detail.

FIG. 5 illustrates the micromachine shutter gallery 500 of FIG. 4 in further detail. As shown in FIG. 5, the micromachine shutter gallery 500 employs one or more spacers 510 to maintain a gap between the planar lightwave chips 510-1, 510-2. Thus, the chips 510-1, 510-2 can be attached to each other with the spacer 510, thereby leaving a gap for the insertion of the shutters. The shutters 500 are opaque pieces that can be can lifted in and out of the gap under the control of a micromachine device. In the exemplary embodiment, the shutters are attached to the tops of the planar lightwave circuits, as shown in FIG. 5. When all of the shutters are out of the lightpath, the device has a flat transmission across all the channels, making it especially useful when used to make a WAD. This also means that one does not have to have one shutter per channel. If some channels will never be dropped, then they will not need shutters. It is important that the higher diffraction orders be blocked. This can be done either by tapering the free-space regions in the vicinity of the shutters or by inserting opaque objects into the gap. It is noted that the shutters can be microfabricated, e.g., from silicon on insulator wafers FIG. 6 illustrates a general block diagram of a wavelength-selective cross connect (WSC) 600. The wavelength-selective cross connect 600 may be used, for example, in a communication system having multiple fiber rings. As shown in FIG. 6, the wavelength-selective cross connect 600 is an optical device having two input ports 610-1 and 610-2 and two output ports 610-3 and 610-4. An incoming signal received on a given incoming port 610-1 and 610-2 is selectively (i) passed to the corresponding output port 610-3 or 610-4, respectively, in a bar state; or (ii) crossed to the opposite output port 610-4 or 610-3, respectively, in a cross state. The wavelength-selective cross connect 600 consists of four wavelength blockers 100-1 through 100-4, which may each be embodied as the wavelength blocker 100 discussed above in conjunction with FIG. 1.

Figure 7:
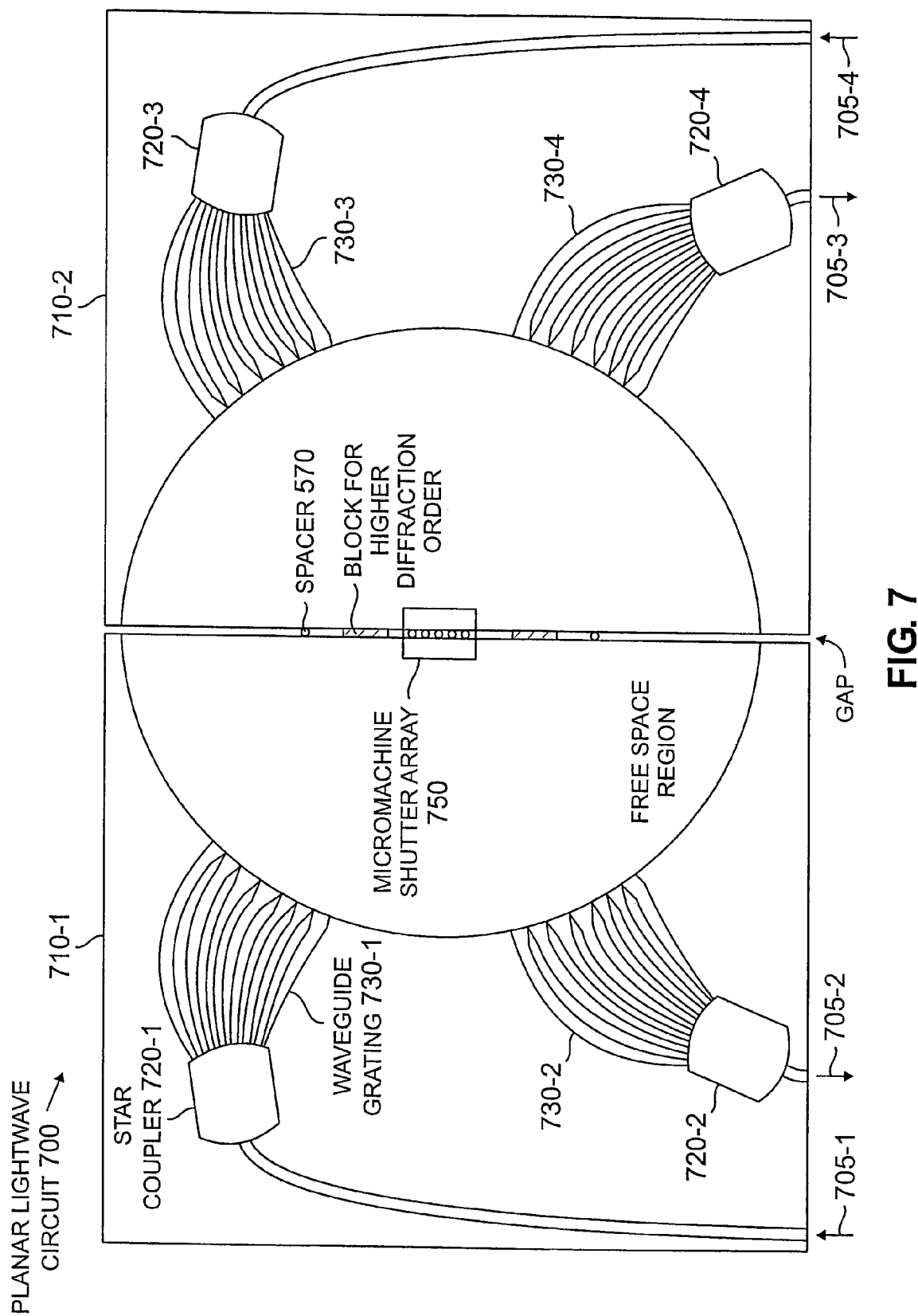
FIG. 7 is an optical diagram illustrating a 2×2 wavelength-selective cross connect (WSC) incorporating features of the present invention.

FIG. 7 is an optical diagram illustrating a 2×2 wavelength-selective cross connect (WSC) 700 incorporating features of the present invention. As shown in FIG. 7, the wavelength-selective cross connect 700 consists of two separate planar lightwave circuits 710-1 and 710-2. Four star couplers 720-1 through 720-4 serve as demultiplexers/multiplexers coupled by waveguide gratings 730-1 through 730-4. The micromachine mirror array 750 may be embodied using the micromachine shutter gallery 500 discussed above in conjunction with FIG. 5, although the opaque shutters are now replaced by mirrors.

The two sets of waveguide gratings 730-1, 730-2 intersect at an angle. Thus, if the mirror 750 for a given channel is up (removed from the light path), then that channel passes across the device and exits the corresponding output port (bar state), otherwise it is reflected and exits the opposite output port (bar state). Additional gratings could be added around the circle and use rotatable mirrors to make 1×N WSC.

Thus, the wavelength-selective cross connect 700 has two input ports 705-1 and 705-2 and two output ports 705-3 and 705-4. An incoming signal received on a given incoming port 705-1 and 705-2 is selectively (i) passed to the corresponding output port 705-3 and 705-4, respectively, in a bar state; or (ii) crossed to the opposite output port 705-3 and 705-4, respectively, in a cross state.

Figure 8:
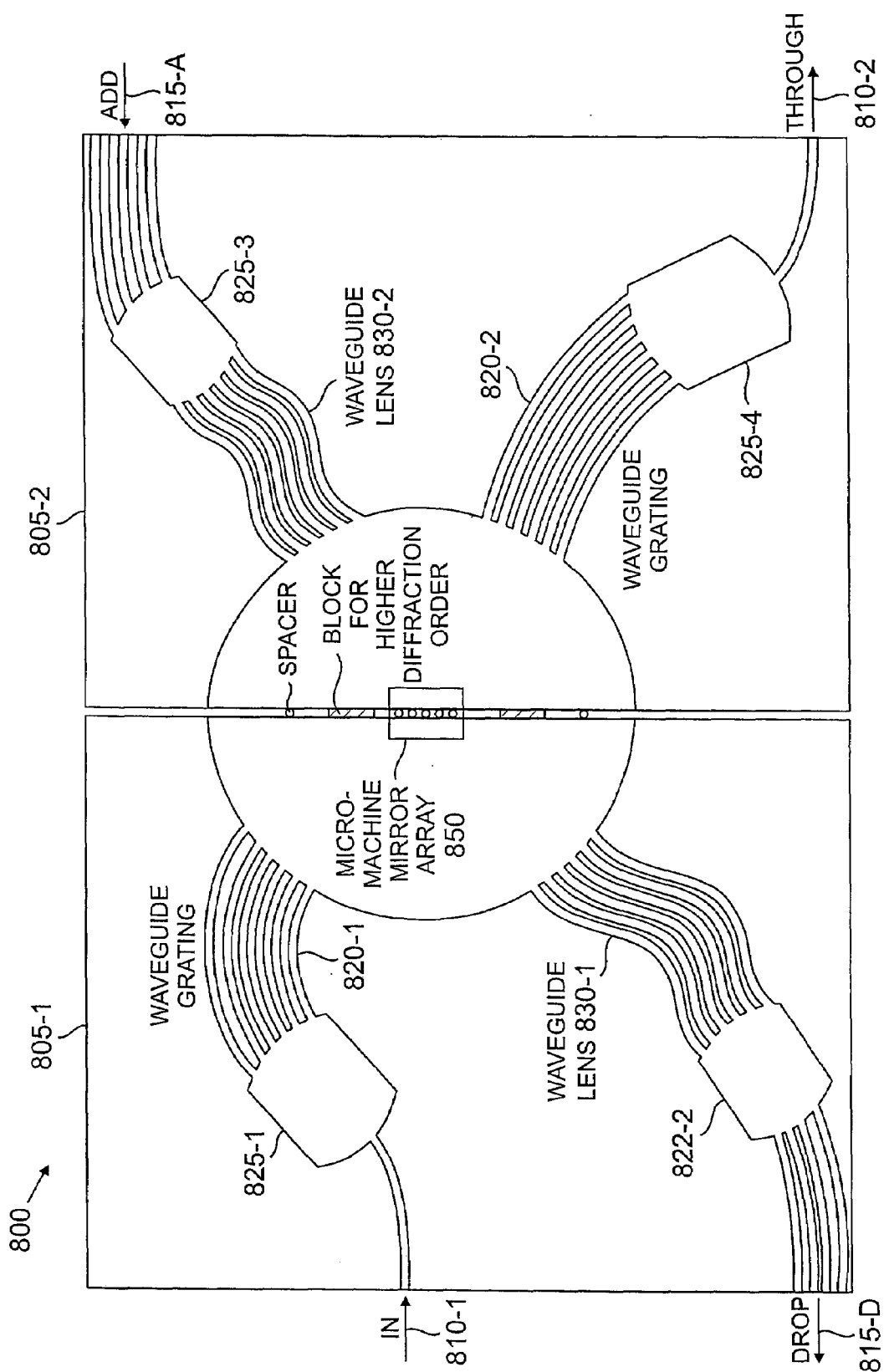
FIG. 8 is an optical diagram illustrating a wavelength add drop multiplexer incorporating features of the present invention

FIG. 8 is an optical diagram illustrating a wavelength add drop (WAD) multiplexer 800 incorporating features of the present invention. As shown in FIG. 8, the WAD multiplexer 800 has an input port 810-1 and an output port 810-2, as well as an add port 815-A and a drop port 815-D. Four star couplers 825-1 through 825-4 serve as demultiplexers/multiplexers coupled by two waveguide gratings 820-1 and 820-2 and two waveguide lenses 830-1 and 830-2 (where path lengths are all equal), as shown in FIG. 8. The micromachine mirror array 750 may be embodied using the micromachine shutter gallery 500 discussed above in conjunction with FIG. 5, although the opaque shutters are now replaced by mirrors. An incoming signal of multiple wavelength channels is accepted at the input port 810-1 and is applied to a waveguide grating 820-1.

The two sets of waveguide gratings and lenses 820, 830 intersect at an angle. Thus, if the mirror 850 for a given channel is up (removed from the light path), then that channel passes across the device and exits the output port 810-2, otherwise that channel is reflected and exits the drop port 815-D, and signals from the add port 815-A are multiplexed together and are sent to the through port.

It is to be understood that the embodiments and variations shown and described herein are merely illustrative of the principles of this invention and that various modifications may be implemented by those skilled in the art without departing from the scope and spirit of the invention.

I claim:

1. A planar lightwave circuit, comprising:
   an I/O waveguide for receiving a multiple wavelength optical signal;
   a plurality of waveguides coupling said I/O waveguide to a free space region to generate a phased array of said optical signal within said free space region; and
   a plurality of mechanical shutters positioned in said free space region at a focal plane of said phased array to selectively control reflection of portions of said multiple wavelength optical signal to a desired one of a plurality of waveguide arrays to provide switching of the multiple wavelength optical signal.

2. The planar lightwave circuit according to claim 1, further comprising at least one additional I/O waveguide, and wherein the planar lightwave circuit provides optical add/drop multiplexing of signals propagated on said I/O waveguides.

3. The planar lightwave circuit according to claim 1, wherein at least one of said plurality of waveguide arrays demultiplexes said multiple wavelength optical signal.

4. The planar lightwave circuit according to claim 1, wherein said plurality of waveguides have different path lengths.

* * * * *